United States Patent [19]

Osburn et al.

[11] 4,117,758

[45] Oct. 3, 1978

[54] BINARY WORD DEBOUNCER

[75] Inventors: James Patrick Osburn, Terre Haute; John William Robinson, Jasper, both of Ind.

[73] Assignee: Kimball International, Inc., Jasper, Ind.

[21] Appl. No.: 738,754

[22] Filed: Nov. 4, 1976

[51] Int. Cl.[2] .......................... G06F 3/02; G10H 1/00; H04L 15/06

[52] U.S. Cl. .............................. 84/1.01; 84/DIG. 23; 340/365 E

[58] Field of Search ................. 84/1.01, 1.26, DIG. 7, 84/DIG. 23; 340/365 E

[56] References Cited

U.S. PATENT DOCUMENTS

| | | | |
|---|---|---|---|
| 2,953,056 | 9/1960 | Hanert | 84/1.26 |
| 3,003,383 | 10/1961 | Williams | 84/1.26 |
| 3,466,647 | 9/1969 | Guzak, Jr. | 340/365 E |
| 3,662,378 | 5/1972 | MacArthur | 340/365 E X |
| 3,750,160 | 7/1973 | Elzinga | 340/365 E |
| 3,765,015 | 10/1973 | Gruner | 340/365 E |
| 3,818,441 | 6/1974 | Nomiya et al. | 340/365 E |
| 3,886,543 | 5/1975 | Marin | 340/365 E |
| 3,902,392 | 9/1975 | Nagahama | 84/1.01 |
| 3,951,028 | 4/1976 | Robinson | 84/1.01 |
| 4,026,180 | 5/1977 | Tomisawa et al. | 84/1.01 X |
| 4,030,398 | 6/1977 | Dittmar | 84/1.26 |

OTHER PUBLICATIONS

Motorola Semiconductor Data Library, vol. 5, Series B 1976, pp. 5-224-30.

*Primary Examiner*—Stanley J. Witkowski
*Attorney, Agent, or Firm*—Albert L. Jeffers; John F. Hoffman

[57] ABSTRACT

A special circuit arrangement intended for use with electronic organs and the like, and particularly intended for use with electronic organs having playing key operated switches and in which at least a portion of the switches actuated by keys of a keyboard are encoded into binary words during playing.

The circuit of the present invention, in particular, is a debouncing circuit which prevents the acceptance by the organ system of a false binary word from the encoder which can be created by the bounce which is inherent in mechanical switches of the type employed for being actuated by the keys of the keyboard.

20 Claims, 3 Drawing Figures

BINARY WORD DEBOUNCER

BACKGROUND OF THE INVENTION

As electronic organ circuitry continues to become more sophisticated, the practice of encoding a portion of a keyboard to a binary word has become quite common. Such encoding is done at high speed, with keys being scanned under the control of a clock running at a rate of up to 150 kilohertz, for example.

The binary word thus developed, or the data corresponding thereto, such as a pulse in a predetermined time slot, can be used for many purposes. Automatic chords, automatic sounding of note patterns, or automatic sounding of bass notes are a few examples of the use of the data which such an encoded word forms, or develops.

A problem associated with the actuation of automatic circuits of the nature referred to by encoded words is that of the mechanical key bounce associated with key switches actuated by the keys of a keyboard. Contact bounce of such key switches can cause false triggering of automatic circuits by supplying false data thereof and must, therefore, be counteracted or eliminated to obtain proper circuit operation.

A simple method of counteracting key bounce is to provide a delay in the acceptance of each new binary word from the keyboard encoder. However, a problem is presented in selecting an optimal delay time. Further complicating the problem is the fact that, while keyboards are manufactured within certain tolerance limits, every keyboard will have differences between the amount of bounce of one key as compared to that of another key.

If keyboard delays are set to compensate for the worst case of difference between keys, the keyboard operation will become sluggish. However, if keyboard delay is decreased to speed up operation, false signals created by key bounce will become a problem.

It is an object of the present invention to develop an improved keyboard delay circuit to eliminate the effects of key bounce.

It is a further object of the present invention to provide a keyboard delay circuit to prevent the development of false data by eliminating key bounce and which is inexpensive to manufacture and is inherently integrable in substantially any circuit through the present state of the art of semiconductor circuits.

BRIEF SUMMARY OF THE INVENTION

The present invention relates to electronic organs, and particularly to those organs which use binary encoding circuits connected to at least a portion of the organ keyboard. Such circuitry operates in a frequency range of about 150 kilohertz and switch bounce can become a problem at such frequencies.

The circuit of the present invention consists of a pair of binary word latches, one forming an input latch to receive a binary word and the other forming an output latch to supply a binary word as an output, and a control circuit therefor. The control circuit is used to sense any change in an input binary word, and to latch a new word into the first of the pair of latches. The control circuit will then latch the new word from the first of the latches into the second, if, during a specified predetermined time interval, the input word does not change.

The output of the second latch forms the output of the debounce circuit. Any time the input word changes, the time delay sequence is reset. Due to this resetting feature, the preset, or predetermined, time interval can be set to a minimum, thus allowing for the fastest possible operation of the keyboard, while providing sufficient protection against false triggering due to key bounce.

The exact nature of the present invention will become more apparent upon reference to the following detailed specification taken in connection with the accompanying drawings, in which.

DETAILED DESCRIPTION OF THE INVENTION

The circuit of the present invention consists of a subsystem within a standard organ unit. Accordingly, to aid in the understanding of the description of the present invention, those portions of the organ circuit which are conventional will not be described herein in detail.

Figure 1:
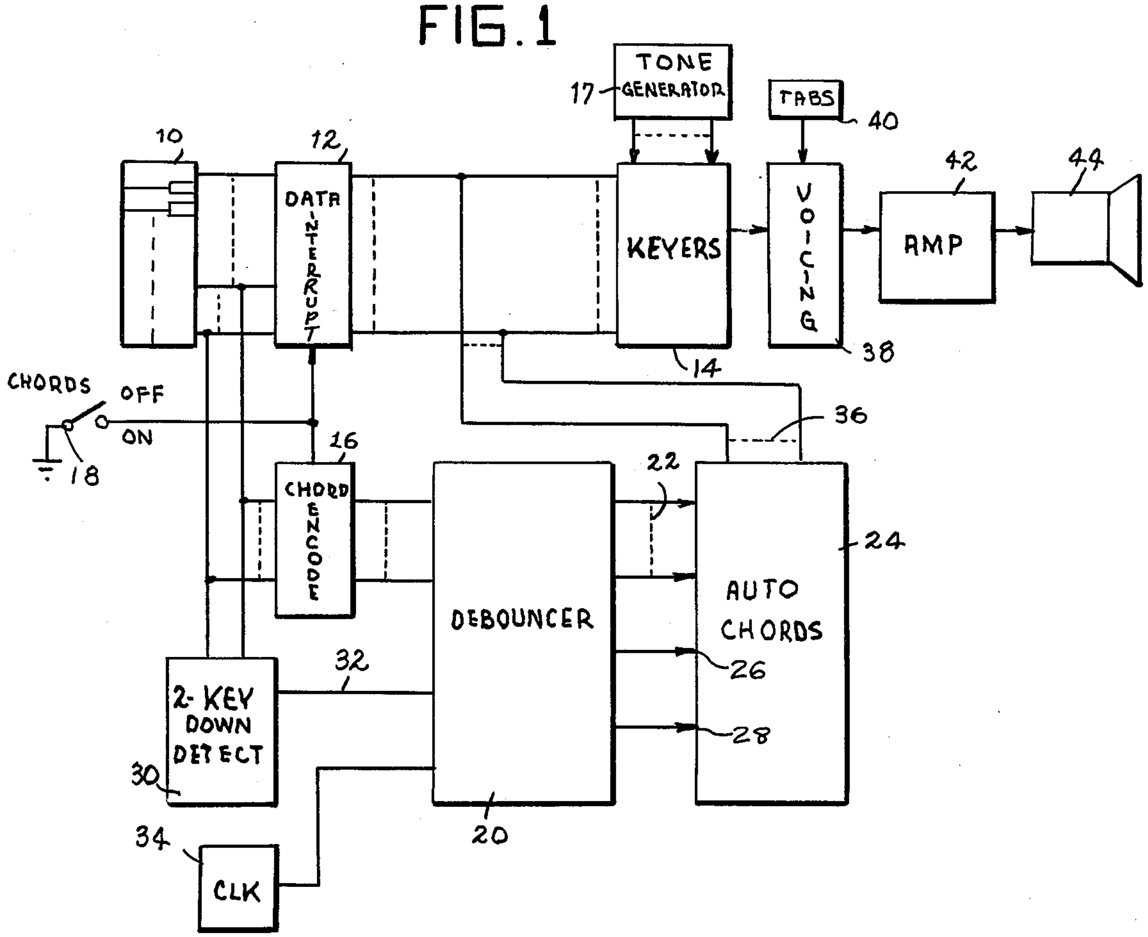
FIG. 1 is a simplified block diagram of a typical organ circuit embodying the circuit of the present invention.

Referring to FIG. 1, an organ manual 10 is connected through a data interrupt circuit 12 to keyer means 14. A portion of the keys of manual 10 are also connected as the inputs to a chord encoding circuit 16. A chord tab switch 18 is provided and is connected as an input to each of data interrupt circuit 12 and chord encode circuit 16.

Switch 18 has an 'OFF' position, as shown, in which the data interrupt circuit 12 is enabled to pass keyboard information from manual 10 to keyers 14 while circuit 16 is disabled. Switch 18 also has an 'ON' position, in which data interrupt circuit 12 will be disabled for passing keyboard information, and, instead, chord encode circuit 16 will encode the portion of manual 10 connected thereto into a four bit binary word.

The binary word output of chord encoding circuit 16 is connected as a first input to a key debouncer circuit 20. Debouncer circuit 20 will accept the four bit input from chord encoding circuit 16, and after a short delay, will supply the four bit word to output terminals 22, which are connected as a first input to automatic chords circuit 24.

An additional output of debouncer circuit 20 is a change key output 26 and keydown output 28. Change key output 26 will produce a pulse for a short period of time immediately following any change in the binary word developed by chord encoding circuit 16, except when the binary word from encoding circuit 16 changes to zero. On the other hand, keydown output 28 will hold a logic signal as long as any keydown information is developed by chord encoding circuit 16.

The previously mentioned portion of manual 10 connected to circuit 16, is also connected to a two keydown detect circuit 30. Detect circuit 30 will produce a logic zero output on wire 32 whenever more than one key is depressed in the said portion of manual 10. Otherwise the output of circuit 30 stays at logic 1.

A final input to the debouncer circuit 20 is a key change clock 34. Clock 34 is used to establish a time interval between the change of the binary word at the output of circuit 16 and the subsequent change in the binary word at the output 22 of debouncer circuit 20.

Automatic chord circuit 24 will produce, when chord switch 18 is in the 'ON' position, key activating signals at output terminals 36 which are interconnected with the key activating outputs of data interrupt circuit 12. Keyers 14, when activated either by data interrupt circuit 12 or by automatic chord circuit 24 will pass selected ones of the outputs of tone generator 17 to voicing circuits 38.

Voicing circuits 38 shape the selected tone signals from keyers 14 according to the setting of tab switches 40 and supply the shaped tone signals to amplifier 42 and speaker 44.

Debouncer circuit 20 is a special circuit provided to eliminate any unwanted keying of automatic chord circuit 24 as a result of key bounce in the portion of manual 10 which is connected as the input to chord encoding circuit 16. Debouncer 20 will establish a time delay from the time the output of circuit 16 changes to a new binary word to the time that the output 22 of debouncer circuit 20 changes to the same word.

Any changes in the new binary word at the output of circuit 16, before output 22 of debouncer 20 changes, will result in the time interval established by debouncer circuit 20 being reset. Therefore, before the output of debouncer circuit 20 will be allowed to change, the input thereto from circuit 16 must remain constant for the predetermined period of time.

Figure 2:
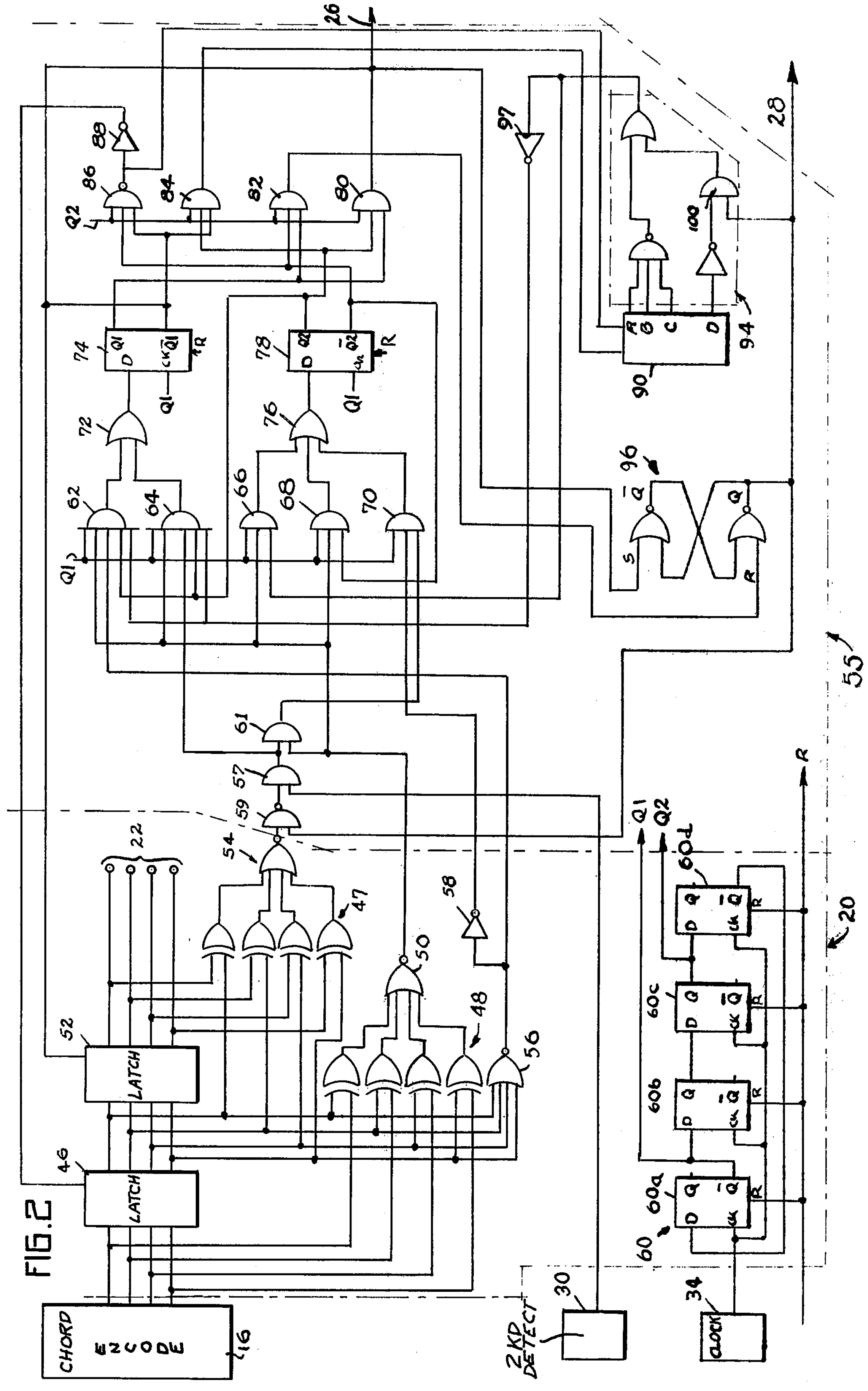
FIG. 2 is a schematic diagram of the circuit of the present invention.

The operation of debouncer circuit 20 can better be understood by reference to FIG. 2 which is a detailed showing of the debouncer circuit 20.

In FIG. 2, a latch 46 has the four bit binary word from chord encoding circuit 16 connected to the D inputs thereof. The D inputs to latch 46 and the Q outputs thereof are also connected to the inputs of a set of four exclusive OR gates 48. The outputs of exclusive OR gates 48 are connected as the four inputs to a NOR gate 50. NOR gate 50 will establish a logic level zero signal at the output thereof whenever the word connected to the D inputs of latch 46 is different from the word latched into the Q outputs of latch 46.

The Q outputs of latch 46 are also connected to the D inputs of a latch 52. The D inputs and the Q outputs of latch 52 are also connected to a set of exclusive OR gates 47 having outputs connected as inputs to a NOR gate 54. The gates referred to function in the same way as exclusive OR gates 48 and NOR gate 50.

The Q outputs of latch 52 form the word output 22 of debouncer circuit 20.

The Q outputs of latch 46 are also connected to the inputs of a NOR gate 56. The output of NOR gate 56 will be at logic 1 whenever the output of latch 46 is equal to zero and forms the input to an inverter 58. The outputs of NOR gates 50 and 56, inverter 58, and NOR gate 54 are used as inputs to a gating circuit portion 55 of the debouncer circuit 20, as shown in FIG. 2.

Inputs to debouncer circuit 20 from circuit 30 and clock 34 are also shown in FIG. 2.

The signal developed by clock 34 is connected to the clocking inputs to each of four edge triggered D type flip flops 60*a*, 60*b*, 60*c* and 60*d*. Flip flops 60*a* through 60*d* are connected as shown in FIG. 2, with the $\overline{Q}$ outputs of flip flops 60*d* and 60*a* connected to the D inputs of flip flops 60*a* and 60*b*, respectively, and the Q outputs of 60*b* and 60*c* connected to the D inputs of flip flops 60*c* and 60*d*, respectively. The Q output of flip flop 60*a* is connected as a clocking input to flip flops 74 and 78, to be described hereinafter.

The Q output of flip flop 60*c* is connected as one input to each of NAND gate 86 and AND gates 80, 82 and 84, also to be described hereinafter.

Figure 3:
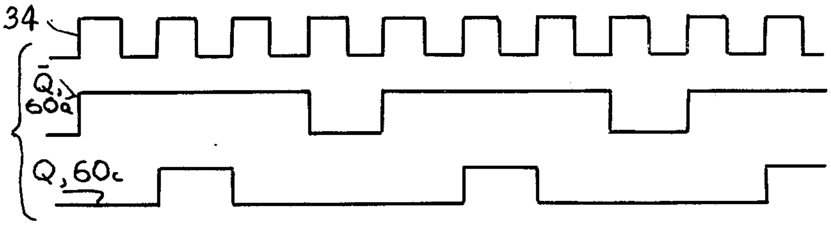
FIG. 3 is a timing diagram showing the relative timing of two clock signals used in the circuit of the present invention.

The wave forms associated with clock 34, the $\overline{Q}$ output of flip flop 60*a*, and the Q output of flip flop 60*c* are shown in FIG. 3.

Gates 80 through 86 are used to produce control signals within debouncer circuit 20, as will be discussed in detail hereinafter, with the positive portion of the Q output from flip flop 60*c* forming the active portion thereof.

The two separate clock signals, namely, the signals from the Q output of flip flop 60*c* and the $\overline{Q}$ output of flip flop 60*a*, make it possible to trigger flip flops based on the condition of the inputs to circuit 55, and to produce control signals within debouncer circuit 20 a short time after the flip flops have been triggered. The time lag between the triggering of the flip flops and the activation of the control signals referred to prevents unwanted momentary pulses within debouncer circuit 20.

The input to debouncer circuit 20 from circuit 30 is connected to one input of an AND gate 57, and consists of a logic 1 signal as long as less than two keys of manual 10 are depressed. When two or more keys of manual 10 are depressed, the output of AND gate 57 will be held at logic zero. The logic zero signal at the output of AND gate 57 will prevent the control circuit portion 55 from clocking latch 52, as will be described hereinafter, and will, therefore, prevent any binary information from encoder 16 from being connected to the output 22 of debouncer 20.

The second input to AND gate 57 is connected to the output of a NAND gate 59. The two inputs of NAND gate 59 are connected to the outputs of NOR gate 54 and the Q output of a flip flop 96, respectively.

NOR gate 54 will develop a logic 1 signal at the output terminal thereof whenever the contents of latch 46 and latch 52 are equal.

The Q output of flip flop 96, which will go to logic 1 when one of the chord playing keys of manual 10 is depressed, will remain at logic 1 for a short time after the key is released.

With a logic 1 signal at the Q output of flip flop 96, the output of NAND gate 59 will switch to logic zero when the outputs of latch 46 and 52 are equal and will, therefore, switch the output of AND gate 57 to logic zero. The logic zero signal at the output of AND gate 57 is connected to a first input of an AND gate 61, and will similarly set the output of AND gate 61 to zero.

AND gate 61 is connected in one input of AND gate 70. When the output of AND gate 70 is at logic level zero, the control circuit 55 is prevented from producing a clocking input to the clock terminal of latch 52 and, therefore, prevents any change in the binary word at the output terminal 22 of debouncer circuit 20, as long as the output of AND gate 70 is held at logic zero.

Looking more closely at the operation of the control circuit portion 55, the remainder of the circuit of debouncer circuit 20 will be described in connection with the operation thereof beginning with the depression of one of the chord playing keys of manual 10.

With one of the chord playing keys of manual 10 depressed, encoder 16 will develop a four bit binary word at the output terminals thereof. The binary word developed by encoder 16 is connected to the input terminals of the latch 46 and, if different from the binary word at the output terminals of latch 46, will cause the output of NOR gate 50 to switch to logic zero.

The output of NOR gate 50 is connected to one input of each of AND gates 62, 64, 66, 68 and through AND gate 61 to AND gate 70, and will cause the output terminals of each of AND gates 62 through 70 to switch to logic zero whenever the depressed one of the chord playing keys of manual 10 is released, or is released and another chord playing key is depressed.

The outputs of AND gates 62 and 64 are connected as the inputs to OR gate 72, with the output of OR gate 72 connected to the D input of an edge triggered D type flip flop 74. Similarly, AND gates 66, 68 and 70 are connected to control the D input of edge triggered D type flip flop 78 through an OR gate 76.

With the outputs of each of AND gates 62 through 70 at logic zero, flip flops 74 and 78 will transfer a logic zero signal to the respective Q outputs thereof at the next rising edge of the $\overline{Q}$ output of flip flop 60*a*.

The Q and $\overline{Q}$ outputs of flip flops 74 and 78 are connected as shown in FIG. 2 to two inputs of each of a group of three AND gates 80, 82 and 84, and one NAND gate 86.

Two of the three inputs to NAND gate 86 are connected to the $\overline{Q}$ outputs of flip flops 74 and 78, respectively. The third input to gate 86 is connected to the Q output of flip flop 60*c* and, therefore, with the $\overline{Q}$ outputs of flip flops 74 and 78 at logic 1, the output of NAND gate 86 will pulse to logic zero during the positive portion of the Q output of flip flop 60*c*. The output of NAND gate 86 is connected through an inverter 88 to the clocking input of latch 46.

Once latch 46 is clocked by NAND gate 86, the output of NOR gate 50 will return to logic 1. The Q output of latch 46 will now contain the newest binary word developed by encoder 16.

It will be assumed, for the present, that the binary word from encoder 16 will now remain constant during the operation of debouncer circuit 20, as described immediately hereinafter.

The outputs of NOR gate 50 will now be at logic 1, and the output of NOR gate 54 and NOR gate 56 will be at logic zero. The logic level of the outputs of NOR gates 50, 54 and 56, and the output of NOR gate 56 inverted by inverter 58, form a group of inputs to AND gates 62 through 70, as shown in FIG. 2.

The $\overline{Q}$ output of flip flop 74 and the Q and $\overline{Q}$ output of flip flop 78 also form inputs to certain ones of AND gates 62 through 70.

Once the output of NOR gate 50 returns to logic 1, the outputs of AND gates 62 and 64 will be at logic zero, while the outputs of gates 66, 68 and 70 will each be at logic 1.

OR gates 72 and 76 will, therefore, supply a logic zero and a logic 1 signal to the D inputs of flip flops 74 and 78, respectively.

Accordingly, the outputs of flip flops 74 and 78 will switch to logic zero and logic 1, respectively, at the next rising edge of the $\overline{Q}$ output of flip flop 60*a*.

With the Q outputs of flip flops 74 and 78 at logic zero and 1, respectively, AND gate 84 will be enabled to pulse during the positive portion of the Q output of flip flop 60*c*. The output of gate 84 is connected to the clocking input of a four bit counter 90. Under the conditions just established, the output of NAND gate 86 will be at logic 1 and is connected to the load/count input to counter 90. With the load/count input at logic 1, counter 90 will be enabled to count in response to pulses at the clocking input thereto from gate 84.

The outputs of counter 90 are connected to the inputs of a count decoding circuit 94. Circuit 94 has a further input thereto connected to the output of flip flop 96, and which will be at logic 1. The output of circuit 94 will switch to logic level zero when the count at the output terminals of counter 90 is at a predetermined count; in this case count 15.

The output of circuit 94 is inverted by inverter 97 and is connected to one input of each of AND gates 62 and 64 and will hold the outputs thereof at logic zero until the predetermined count has been reached by counter 90. AND gates 62 and 64 will, therefore, hold the Q and $\overline{Q}$ outputs of flip flop 74 at logic zero and 1, respectively, until the outputs of counter 90 reach count 15.

All of the inputs to each of AND gates 66 and 70, taken from the outputs of NOR gates 50 and 54, and the $\overline{Q}$ output of flip flop 74 will be at logic 1, and will therefore hold the Q output of flip flop 78 at logic 1.

With the outputs of flip flops 74 and 78 held to the states just described, the output of AND gate 84 will continue to supply an input pulse to counter 90 for each positive pulse at the Q output of flip flop 60*c*.

When the count at the output terminals of counter 90 reaches a predetermined count, the outputs of circuit 94 and inverter 97 will change to logic zero and logic 1, respectively. The output of circuit 94 will set the output of AND gate 66 to logic zero, while the output of inverter 97 will allow one of AND gates 62 and 64 to change to logic 1.

It will be noted that one input to AND gate 62 is connected from NOR gate 56, and will be at logic zero except when the contents of latch 46 are equal to zero, while the output of NOR gate 56 is inverted by inverter 58 and connected to one input of AND gate 64.

With the conditions presently established, AND gate 64 will switch the output of OR gate 72 to logic 1. AND gate 70 will remain at logic 1, and the next rising edge of the $\overline{Q}$ output of flip flop 60*a* will switch the Q and $\overline{Q}$ outputs of each of flip flops 74 and 78 to logic 1 and zero, respectively.

With the Q outputs of both flip flops 74 and 78 at logic 1, the output of AND gate 80 will pulse to logic 1 during the next positive pulse at the Q output of flip flop 60*c*. The output of AND gate 80 is connected to the clocking terminal of latch 52, and will cause latch 52 to transfer the input word thereto from latch 46 to output 22 of debouncer circuit 20, also referred to as debouncer 20.

The $\overline{Q}$ output of flip flop 74 will set the outputs of each of AND gates 62 through 70 to logic zero, and the Q output of both of flip flops 74 and 78 will, therefore, switch to logic zero at the next rising edge of the $\overline{Q}$ output of flip flop 60*a*.

The output of NAND gate 86 will pulse during the next positive pulse at the Q output of flip flop 60*c*, thus resetting counter 90 to count zero.

With counter 90 reset, the output of each of AND gates 62 and 64 will be held at logic zero, thus holding the Q and $\overline{Q}$ outputs of flip flop 74 to logic zero and logic 1, respectively.

AND gate 66 will provide a logic 1 signal to the D input of flip flop 78 through OR gate 76. The output of AND gate 66 will remain at logic 1 until the input binary word from encoder 16 is changed. At the next rising edge of the $\overline{Q}$ output of flip flop 60*a* the Q outputs of flip flops 74 and 78 will switch to logic zero and logic 1, respectively.

The Q outputs of flip flop 74 and 78 will remain at logic zero and logic 1, respectively, and the output of AND 84 will continue to provide clocking pulses to counter 90, until the count developed at the outputs of counter 90 reach a count of 15. When count 15 is reached, the output of AND gate 66 will switch to logic zero. Since the binary word at the output of latch 52 will now be equal to the binary word at the output of latch 46, the output of AND gate 70 will now be a logic zero. Also, the outputs of each of AND gates 62, 64 and 68 will be a logic zero.

The logic zero at the outputs of each of gates 62 through 70 will cause the Q outputs of each of flip flops 74 and 78 to switch to logic zero. The logic 1 signal at the $\overline{Q}$ output of 74 and 78 will enable NAND gate 86 to reset counter 90.

As long as the input word of encoder 16 remains constant, the above cycle repeats, with counter 90 simply counting to count 15 repetitively. It will be noted that the output of AND gate 80 is not pulsed during this time, but is pulsed only once for each time the depressed one of the chord playing keys of manual 10 is changed.

The output of AND gate 80 is also connected as output of debouncer 20 and pulses to logic 1 for a short time each time a new chord playing key of manual 10 is depressed.

To complete the discussion of the operation of the debouncer 20, it is assumed that the input word from encoder 16 changes to logic zero, corresponding to the condition in which each of the chord playing keys of the manual 10 is released.

The operation of debouncer 20 will be similar to that described above, with the output of NOR gate 50 setting the Q output of each of flip flops 74 and 78 to logic zero, and enabling NAND gate 86 to reset counter 90, and to provide a clocking pulse to latch 46 through inverter 88. The output of NOR gate 50 will then return to logic 1. However, the output of NOR gate 56 will now pulse to logic 1 and inverter 58 will provide a logic zero signal to one input of each of AND gates 64 and 70.

As in the operation previously described, the Q and $\overline{Q}$ outputs of flip flop 74 and 78 will again be set to logic zero and logic 1, respectively, and held in that condition while AND gate 84 provides clocking pulses to counter 90.

When the count at the output of counter 90 reaches count 15, the output of inverter 96 will allow the output of AND gate 62 to change to logic 1, while the output of AND gate 66 will change to logic zero. Accordingly, the Q outputs of flip flops 74 and 78 will change to logic 1 and logic zero, respectively, at the next rising edge of the $\overline{Q}$ output of flip flop *60a*.

With the Q outputs of flip flops 74 and 78 thus set, the output of AND gate 82 will be enabled to pulse during the next positive pulse at the Q output of flip flop *60c*. The output of AND gate 82 is connected to the reset input to flip flop 96, and will reset the Q output thereof to logic zero.

It is to be noted that when the count at the outputs of counter 90 reach the predetermined count of count 15, with the contents of latch 46 equal to zero, that the output of AND gate 80 was not pulsed. Accordingly, the output of latch 52 and, therefore, the output 22 of debouncer 20 will retain the binary word previously clocked therein.

With the Q output of flip flop 96 at logic zero, the output of AND gate 100 will be held at logic zero. With the output of AND gate 100 at logic zero, circuit 94 will produce a pulse at the output thereof whenever the count at the output terminals of counter 90 reaches the count of seven.

As long as the binary word input to the debouncer 20 from circuit 16 is maintained at logic zero, the operation of debouncer 20 will cycle through the steps described with the exception that circuit 94 will now produce a pulse each time counter 90 reaches count seven.

Additionally, it will be noted that, whenever the binary word at the output of encoder circuit 16 changes to a new binary word, the output of NOR gate 50 will immediately switch to logic zero, and will set the outputs of each of AND gates 62, 64, 66, 68 and 70 to logic zero and, will, therefore, enable NAND gate 86 to provide a clocking pulse to the load terminal of latch 46 through inverter 88, and to reset counter 90 to count zero.

The operation of debouncer 20 at this point will be identical to the operation of debouncer 20 as described in reference to the depression of a new one of the chord playing keys of debouncer 20, described above, with the exception that AND gate 80 will be enabled to clock latch 52 and to set flip flop 96 when counter 90 reaches count seven.

Additionally, the logic zero at the output of flip flop 96 will allow the output of AND gate 70 to switch to logic 1 when the output of inverter 58 returns to logic 1. The output of flip flop 96 connected to one input of NAND gate 59, thus insures that the output of AND gate 80 will pulse to logic 1 when a key of manual 10 is again depressed, and more specifically, insures that the output of AND gate 80 will pulse, even if a new key depressed in manual 10 is the same key that was previously depressed. Without the connection of the output of flip flop 94 to one input of NAND gate 59, if a particular key of manual 10 were released, and then depressed again, AND gate 80 would not be enabled to produce a pulse because the output of NOR gate 54 would switch to logic 1 and the output of NAND gate 59 would switch to logic zero, thus holding the output of AND gate 70 at logic zero, and preventing flip flop 78 from enabling AND gate 80.

The count at the output of counter 90 must reach the predetermined count of count 15 before the binary word from encoder circuit 16 will be transferred from the output terminals of latch 46 to the output terminals of latch 52, and any changes occurring at the output of encoder circuit 16, such as, those changes created by normal key bounce in manual 10, will reset counter 90 to count zero, and will prevent the binary word at the output of latch 46 from being presented to the output terminals 22 of debouncer 20 until the output of circuit 16 remains constant for a full 15 pulses at the Q output of flip flop *60c*.

The actual time delay between the depression of the new chord playing key in manual 10 and the corresponding change at output 22 of debouncer 20 is controlled by the frequency of clock 34, and the corresponding length of time required for the count at the outputs of counter 90 to reach count 15.

The arrangement wherein the output of NOR gate 50 will pulse to logic zero whenever the binary word from encoder 16 changes, and which resets counter 90 each time the binary word from encoder 16 so changes, makes it possible to set the frequency of clock 34 at a rate which allows counter 90 to count to fifteen in a relatively short time period, while ensuring that counter 90 will be prevented from counting to fifteen until the binary word from encoder 16 remains stable for a full 15 counts of counter 90.

It will be apparent that different time delay peiods are available when a key is depressed and when a key is released. In the foregoing description, two count decoders having different decode lengths are employed but alternate methods are applicable, such as the use of two clocks, or the use of a divider at the input to counter 90.

More specifically, decoder 90 could consist of a fixed count decoder and the output of flip flop 96 could be used to vary the frequency of clock signal 34 by directing the clock signal 34 through a divide by two flip flop, as could be provided by connecting signal 34 to an input of each of two AND gates and the complimentary output of flip flop 96 to the second inputs thereto. The AND gates would then be connected, one divide and one through a divider to the input to flip flops 60*a* to 60*d*.

Although the above description refers to element 46 and 52 as latches, in their broadest sense they function as a storage station for selectively temporarily storing signals placed on its input. The present invention also contemplates a method for compensating for the effect of switch bounce in respect of a signal which originates at a switch for supply to a place of use which comprises supplying the signal from the switch to the input side of a storage station, repetitively inserting the signal at the input side of the storage station into the station, comparing the signal therein with the signal at the input side, and supplying the signal in the storage station to the place of use at the end of a predetermined time delay period during which the signal supplied to the input side remains the same as the signal in the station.

Such modifications are contemplated within the scope of the appended claims.

What is claimed is:

1. The method of compensating for the effect of switch bounce in a signal wherein the signal originates at a switch and is supplied to place of use, said method comprising: supplying the signal from the switch to the input side of a storage station which also has an output side, repetitively inserting the signal at the input side of the storage station into the station, comparing the signal in the storage station with the signal at the input side of the storage station, and supplying the signal in the storage station to said place of use at the end of a predetermined time delay period during which the signal supplied to the input side of the storage station remains the same as the signal in the storage station.

2. The method according to claim 1 in which the time delay period is restarted upon the signal at the input side of the storage station becoming different from the signal in the storage station.

3. The method according to claim 1 in which the storage station is updated by insertion therein of the signal at the input side whenever the said comparing of the signals shows a difference therein, and restarting the said time delay period each time the storage station is updated.

4. A circuit for eliminating the effect of switch bounce comprising:

storage means for storing a binary word, said means having a binary word input and a binary word output, means for repetitively transferring the binary word at the input into said storage means, means for comparing the binary word at the input with the binary word in said storage means, and means for transferring the binary word in said storage means to the output at the end of a predetermined time delay period only if during the delay period the binary word at the input remains the same as the binary word in said storage means.

5. The circuit of claim 4 including means for restarting said delay period each time the binary word at the input changes.

6. A circuit for eliminating the effect of switch bounce comprising:

first latch means having input means for receiving an input signal and having an output, second latch means serially connected to said first latch means and having an output, means for clocking said first latch means each time the input signal at the input means thereof changes, and means for clocking said second latch means at the end of a predetermined time delay period only if during said period there has been no change in signal between the input means and the output of said first latch means.

7. The circuit of claim 6 wherein said second latch means includes an input connected to the output of said first latch means.

8. A circuit according to claim 6 wherein the input signal is a binary word and including clock operated means for periodically clocking said first latch means to transfer the word on the input means of said first latch means to the output thereof, comparing means for comparing the word at the output of said first latch means to the word at the input means thereof, and means operated by said comparing means when said words are the same to prevent clocking of said first latch means.

9. A circuit according to claim 6 which includes clock operated counter means operable for establishing said time delay period, and means for setting said counter means to zero each time the signal at the input means of said first latch means differs from the signal at the output thereof.

10. A circuit according to claim 6 which includes means connected to the input means and the output of said first latch means and operable to develop 11. A circuit according to claim 6 in which the input signal comprises a multiple bit binary word, each latch means having an input line and an output line for each bit of the binary word supplied to said input means, a clock operated counter adapted at a predetermined count to clock said second latch means and having a reset terminal responsive to a control signal to reset the counter to zero, gate means having inputs connected to the input lines and output lines of said first latch means, and means connected to said reset terminal and actuated by said gate means for supplying a said control signal to said reset terminal each time the signals supplied to the inputs of said gate means from said input lines differ from the signals from said output lines supplied to the inputs of said gate means.

12. A circuit according to claim 6 in which said input signal comprises a multiple bit binary word, each latch means having an input line and an output line for each bit of the binary word supplied to said input means, a clock operated counter adapted at a predetermined count to clock said second latch means and having a reset terminal responsive to a control signal to reset the counter to zero, exclusive OR gates each having the input side connected to the input line and output line of said first latch means pertaining to a respective bit of said binary word, and means including further gate means connected to the outputs of said exclusive OR gates for supplying a control signal to said reset terminal whenever an output signal is developed by any of said exclusive OR gates.

13. A circuit according to claim 6 in which said circuit includes a clock supplying first pulses of longer duration and second pulses of shorter duration during the period of each first pulse, a counter, means responsive to a change in the input signal at said input means for clocking said first latch means during a said second pulse while simultaneously setting said counter to zero, means operated by said clock pulses for actuating said counter when the input to the said first latch means is equal to the output thereof, means responsive to said counter reaching a predetermined count for clocking said second latch means, and comparing means connected to the input means and output of said first latch means and responsive to a condition of difference between the input means and output of said first latch means for resetting said counter to zero.

14. A circuit according to claim 13 in which said input signal comprises a multiple bit binary word, said first latch input means and output respectively comprise an input line and an output line for each bit of the binary word, and said comparing means comprises a plurality of exclusive OR gates each having one input connected to an input line of said first latch means and another input connected to the corresponding output line of the first latch means.

15. A circuit according to claim 14 in which said second latch includes an input, said second latch input and output respectively comprise an input line and an output line for each bit of the binary word, and including further exclusive OR gates each having one input connected to an input line of said second latch means and another input connected to the corresponding output line of the second latch means, and further circuitry including gate means connected to receive the outputs of said exclusive OR gates and said first and second clock pulses and operable to develop the control signals for clocking said latch means and for actuating said counter.

16. A circuit according to claim 15 which includes a group of playing keys and means responsive to the depression of more than a single one of said group of playing keys at the same time for disabling said circuit.

17. A circuit according to claim 16 which includes a flip flop having one signal producing state when one of said group of playing keys is depressed and also having a second state, and further circuitry also being connected to supply set and reset signals to said flip flop.

18. A circuit according to claim 16 in which said further circuitry includes means for developing a signal when a change occurs in said group of playing keys.

19. In an electronic organ having a tone generator, a transducer, keyers interposed between said generator and transducer and keyboard means comprising playing keys; first means connecting said playing keys with said keyers for actuation of the keyers when respective playing keys are depressed, second means connecting said playing keys with said keyers for actuation of groups of said keyers in response to the depression of respective playing keys of at least a selected group thereof, selector means adjustable for making either one only of said first and second means effective, said second means comprising an encoder operable to develop a respective binary word in response to the depression of each playing key of said group thereof, delay circuit means receiving said binary word as an input and having a output, a chord generating circuit interposed between said output and said keyers for actuating at least one keyer for each binary word developed at said output, and means in said delay circuit means operable automatically for preventing the supply of a binary word to said output until the supply of the same word to said input has been stabilized for a predetermined length of time.

20. An electronic organ according to claim 19 in which said delay circuit means includes a first latch having input terminals connected to said input and a second latch having output terminals connected to said output, said second latch having input terminals, said first latch having output terminals being connected to input terminals of said second latch, and each latch having a clock terminal, means for pulsing the clock terminal of said first latch, and means for pulsing the clock terminal of said second latch when the words at the input and output terminals of said first latch have remained equal and unchanged for a predetermined period of time.

* * * * *

UNITED STATES PATENT AND TRADEMARK OFFICE

CERTIFICATE OF CORRECTION

PATENT NO. : 4,117,758

DATED : October 3, 1978

INVENTOR(S) : JAMES PATRICK OSBURN and JOHN WILLIAM ROBINSON

It is certified that error appears in the above-identified patent and that said Letters Patent are hereby corrected as shown below:

Column 1, line 23 - "thereof" should be --thereto--.

Column 8, line 6 - after "described" insert --above--.

Claim 10, Column 10, Line 45 - after "develops" add--a control signal whenever the signals at said input means and output of the first latch means differ, a clock operated counter operable for establishing said time delay period, and means operated by said control signal for setting said counter to zero.--

Signed and Sealed this

*Sixth* Day of *March 1979*

[SEAL]

*Attest:*

RUTH C. MASON
*Attesting Officer*

DONALD W. BANNER
*Commissioner of Patents and Trademarks*